US 12,253,104 B2
Mar. 18, 2025

(12) United States Patent
Davis

(10) Patent No.: US 12,253,104 B2
(45) Date of Patent: Mar. 18, 2025

(54) REACTION WASHER

(71) Applicant: PRIMESOURCE CONSULTING LLC, Herriman, UT (US)

(72) Inventor: John Davis, Herriman, UT (US)

(73) Assignee: PRIMESOURCE CONSULTING LLC, Herriman, UT (US)

( * ) Notice: Subject to any disclaimer, the term of this patent is extended or adjusted under 35 U.S.C. 154(b) by 125 days.

(21) Appl. No.: 18/185,954

(22) Filed: Mar. 17, 2023

(65) Prior Publication Data
US 2024/0309906 A1  Sep. 19, 2024

(51) Int. Cl.
F16B 37/00 (2006.01)
F16B 39/24 (2006.01)

(52) U.S. Cl.
CPC ........ F16B 39/24 (2013.01); F16B 2200/506 (2018.08)

(58) Field of Classification Search
CPC ............................ F16B 39/24; F16B 2200/506
USPC ......................................................... 411/427
See application file for complete search history.

(56) References Cited

U.S. PATENT DOCUMENTS

| | | | |
|---|---|---|---|
| 605,788 A * | 6/1898 | Johnson | |
| 625,529 A | 5/1899 | Andress | |
| 910,712 A | 1/1909 | McCoy | |
| 2,102,495 A * | 12/1937 | England | F16B 39/24 411/164 |
| 3,077,218 A * | 2/1963 | Ziegler | F16B 39/24 411/161 |
| 3,263,727 A | 8/1966 | Herpolsheimer | |
| 3,417,802 A | 12/1968 | Oldenkott | |
| 3,759,119 A | 9/1973 | Wing | |
| 4,538,313 A | 9/1985 | Frieberg | |
| 4,708,555 A | 11/1987 | Terry | |

(Continued)

FOREIGN PATENT DOCUMENTS

| | | |
|---|---|---|
| CN | 208793433 | 4/2019 |
| DE | 684466 C | 11/1939 |

(Continued)

OTHER PUBLICATIONS

Bolting Systems International (BSI), "The Tomahawk Tool", Operations, Maintenance and Parts Manual, Rev. 1, BD-TOM001-A, 34 pages.

(Continued)

Primary Examiner — Gary W Estremsky
(74) Attorney, Agent, or Firm — Rankin, Hill & Clark LLP

(57) ABSTRACT

A reaction washer can include a castellated portion circumferentially disposed around a perimeter of the reaction washer and a main body portion defining an inner diameter that slidingly receives an associated threaded element therethrough. The castellated portion can include a plurality of castellations that cooperate to define an outer diameter of the reaction washer. Further, the main body can include a first side and a second side that face in opposite directions and an inner engagement ring that extends from the first side and is coaxially disposed between the inner diameter and the castellated portion. The inner engagement ring can include a plurality of serrations that each define a respective serration axis that do not intersect with the engagement axis.

22 Claims, 11 Drawing Sheets

(56) References Cited

U.S. PATENT DOCUMENTS

| | | | |
|---|---|---|---|
| 5,011,351 A * | 4/1991 | Terry | F16B 39/24 |
| | | | 411/161 |
| 5,080,545 A | 1/1992 | McKinlay | |
| 5,318,397 A | 6/1994 | Junkers | |
| 5,341,560 A | 8/1994 | Junkers | |
| 5,499,558 A | 3/1996 | Junkers | |
| 5,538,379 A | 7/1996 | Junkers | |
| 5,539,970 A | 7/1996 | Junkers | |
| 5,626,449 A | 5/1997 | McKinlay | |
| 5,640,749 A | 6/1997 | Junkers | |
| 5,946,789 A | 9/1999 | Junkers | |
| 6,152,243 A | 11/2000 | Junkers | |
| 6,230,589 B1 | 5/2001 | Junkers | |
| 6,254,323 B1 | 7/2001 | Junkers | |
| 6,461,093 B1 | 10/2002 | Junkers | |
| 6,490,952 B2 | 12/2002 | Junkers | |
| 6,609,868 B2 | 8/2003 | Junkers | |
| 6,883,401 B2 | 8/2005 | Junkers | |
| 6,929,439 B2 | 8/2005 | Junkers | |
| 6,986,298 B2 | 1/2006 | Junkers | |
| 7,003,862 B2 | 2/2006 | Junkers | |
| 7,066,053 B2 | 6/2006 | Junkers | |
| 7,125,213 B2 | 10/2006 | Junkers | |
| 7,158,902 B2 | 1/2007 | Damodaran et al. | |
| 7,188,552 B1 | 3/2007 | Koppenhoefer | |
| 7,207,760 B2 | 4/2007 | Junkers | |
| 7,261,506 B2 | 8/2007 | Smolarek | |
| 7,735,397 B2 | 6/2010 | Junkers | |
| 8,079,795 B2 | 12/2011 | Junkers | |
| 8,631,724 B2 | 1/2014 | Miyata | |
| 8,978,232 B2 | 3/2015 | Junkers | |
| 9,011,060 B2 | 4/2015 | Hyatt | |
| 10,107,325 B2 | 10/2018 | Davis et al. | |
| 10,974,665 B2 * | 4/2021 | Heiselbetz | F01N 13/1811 |
| 11,396,902 B2 * | 7/2022 | Davis | F16B 39/282 |
| 11,534,894 B2 | 12/2022 | Davis | |
| 11,920,625 B2 * | 3/2024 | Cattaneo | F16B 39/282 |
| 2011/0170983 A1 * | 7/2011 | Day | F16B 39/24 |
| | | | 472/137 |
| 2014/0212240 A1 * | 7/2014 | Weng | F16B 39/24 |
| | | | 411/145 |
| 2017/0122361 A1 * | 5/2017 | Davis | B25B 23/0078 |
| 2021/0375442 A1 * | 12/2021 | Haag | G06Q 30/0201 |
| 2022/0106976 A1 * | 4/2022 | Seyboldt | F16B 39/24 |
| 2024/0102506 A1 * | 3/2024 | Seyboldt | F16B 39/24 |

FOREIGN PATENT DOCUMENTS

| | | |
|---|---|---|
| DE | 2413760 A1 | 11/1974 |
| WO | 2015095425 A2 | 6/2015 |
| WO | 2015100115 A2 | 7/2015 |
| WO | 2015152728 A1 | 10/2015 |
| WO | 2020182875 | 9/2020 |
| WO | 2020256904 | 12/2020 |

OTHER PUBLICATIONS

ASTM International, Standard Specification for Hardened Steel Backup and Reaction Washers Inch and Metric Dimensions 1,2:, Designation: F3394/F3394M-20, Licensed to Primesource Consulting LLC user, 7 pages.

International Search Report for PCT/US2023/064646 dated Oct. 23, 2023, 7 pages.

Written Opinion of the International Searching Authority for PCT/US2023/064646 issued Oct. 23, 2023, 6 pages.

* cited by examiner

REACTION WASHER

BACKGROUND

A nut or bolt head may be tightened by a tool while transferring the counteracting reaction torque onto a washer beneath that nut or bolt head. This provides for a balanced, localized overall torque transfer that is self-centering and does not require the need to manually oppose the actuation torque or support the tool eccentrically via a reaction member.

A reaction washer transfers the received reaction torque onto a flange beneath. From the flange, the reaction torque is transferred onto a threaded element via which it counteracts the actuation torque. To avoid slipping and effectively transfer the reaction torque onto the flange, reaction washers commonly employ serrations on a bottom (first side) to bite into the flange. In order for these serrations to bite, a contact force must be induced during initial tightening that is large enough for a given overall contact area of the bottom serrations to penetrate into the flange. Only then, the reaction washer won't slip and spin when the tool starts to apply torque to the nut and/or bolt head while withholding itself via a concentric reaction socket on the reaction washer.

The friction on a top (second side) of the reaction washer top has to be lower than on the reaction washer bottom to prevent the reaction washer to be rotated with the nut instead of biting into the flange during initial manual tightening. Therefore, there exists a need for a reaction washer that maximizes bite on the first side and provides low friction on its top during initial tightening and that secures the nut and/or bolt head after fully tightening it.

As reaction washers are very convenient for tightening and/or loosening nuts and/or bolt heads, there exists a need for a reaction washer that more effectively engages the flange.

SUMMARY

In view of the foregoing, a reaction washer can include a castellated portion circumferentially disposed around a perimeter of the reaction washer and a main body portion defining an inner diameter that slidingly receives an associated threaded element therethrough. The castellated portion can include a plurality of castellations that cooperate to define an outer diameter of the reaction washer. Further, the main body can include a first side and a second side that face in opposite directions and an inner engagement ring that extends from the first side and is coaxially disposed between the inner diameter and the castellated portion. The inner engagement ring can include a plurality of serrations that each define a respective serration axis that do not intersect with the engagement axis.

DETAILED DESCRIPTION

Figure 1:
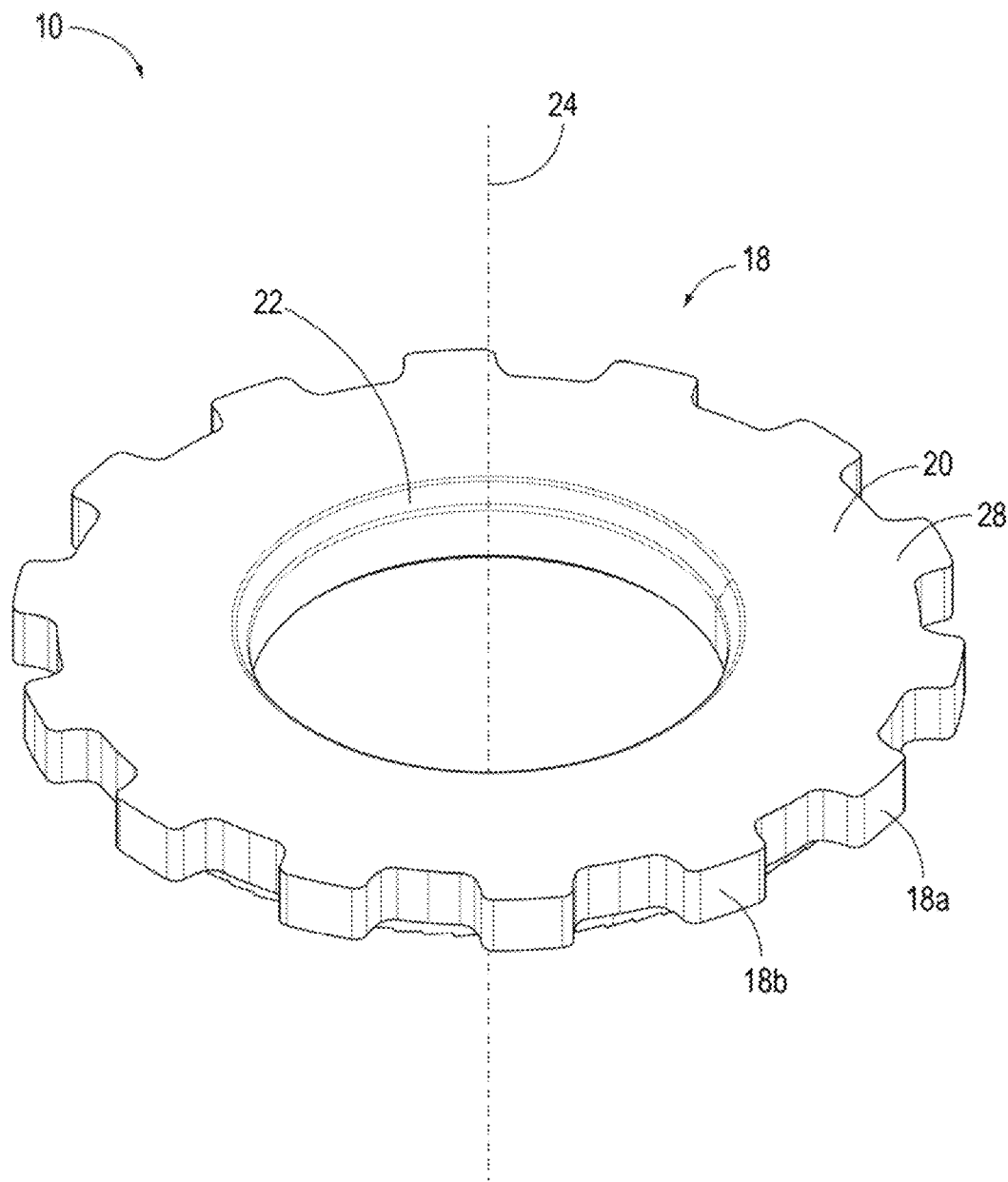
FIG. 1 is a top perspective view of a reaction washer.

It should, of course, be understood that the description and drawings herein are merely illustrative and that various modifications and changes can be made in the structures disclosed without departing from the present disclosure. Referring now to the drawings, wherein like numerals refer to like parts throughout the several views, the figures schematically depict a reaction washer 10 according to the present disclosure.

Figure 5:
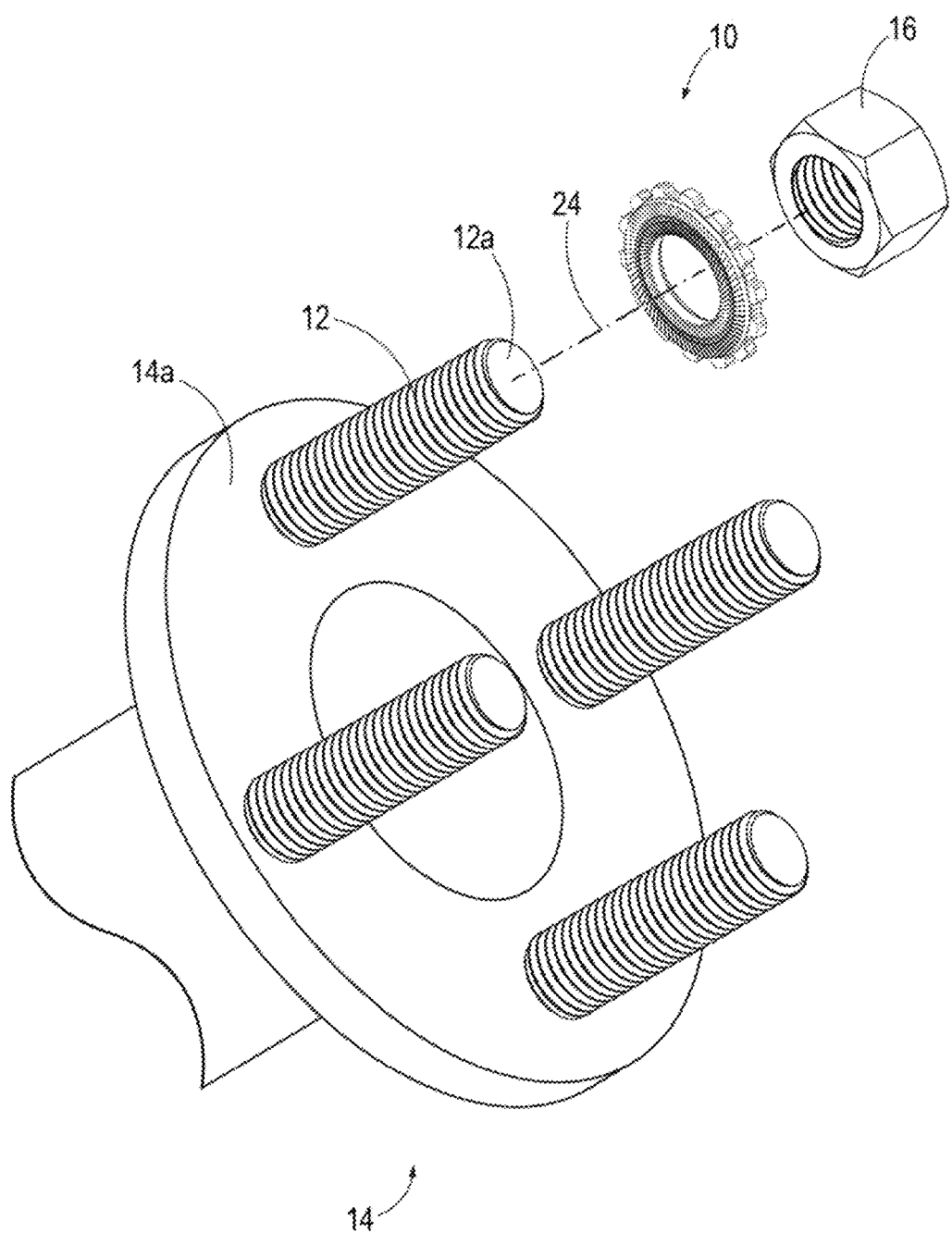
FIG. 5 is a perspective view of the reaction washer with a flange and a nut.
Figure 6:
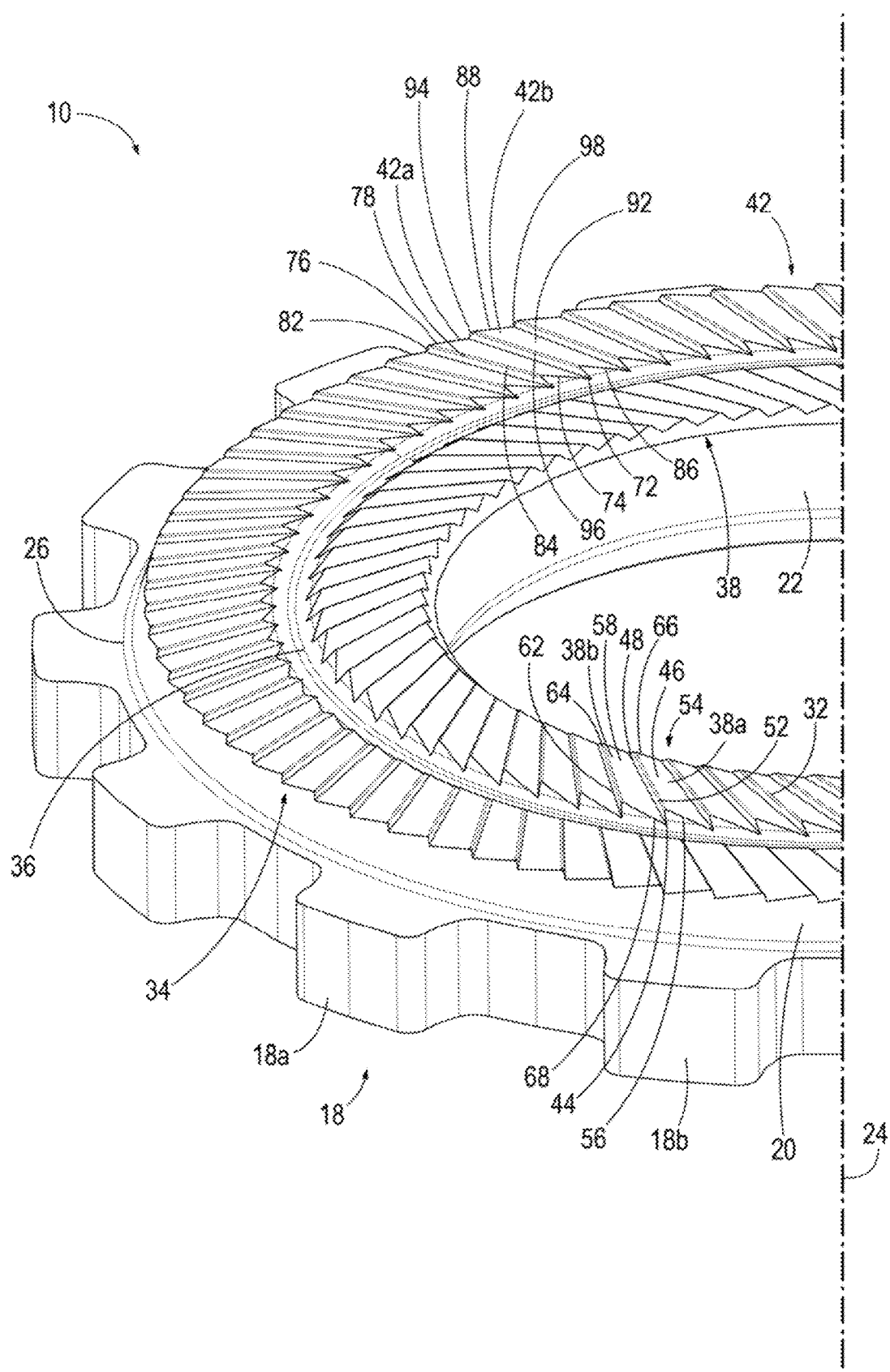
FIG. 6 is a further perspective view of the reaction washer.

With reference to the figures, a reaction washer 10 is shown. Notably, as shown in FIG. 5, the reaction washer 10 can be slid onto a free end 12a of a threaded element 12 so as to engage a mating face 14a of a flange 14. Further, a nut 16 can threadably engage the threaded element 12 so as to capture the reaction washer 10 on the threaded element 12 between the nut 16 and the mating face 14a of the flange 14. Thus, the reaction washer 10 is disposed on the threaded element 12 so that the nut 16 is between the reaction washer 10 and the free end 12a of the threaded element 12 so as to engage a tool (not shown). As will be described in more detail hereinafter, the features of the reaction washer 10 prevent rotation of the reaction washer 10 about the threaded element 12 by engaging the mating face 14a of the flange 14, thereby allowing the tool to solely rotate the nut 16 without the entirety of the tool rotating about the threaded element 12.

More particularly, the tool can simultaneously and circumferentially engage the nut 16 and the reaction washer 10 by at least partially radially surround the nut 16 and the reaction washer 10 (as will be described in more detail hereinafter). Thus, the tool can be utilized to tighten or loosen the nut 16. As will be appreciated, this means that the nut 16 would travel along the threaded element 12 away from the flange 14 (or toward the free end 12a) when the nut 16 is being loosened so that the nut 16 could be removed from the threaded element 12 and the nut 16 would travel along the threaded element 12 away from the free end 12a (or toward the mating face 14a of the flange 14) when the associated threaded element 12 is being tightened so that the nut 16 cannot be removed from the threaded element 12.

Figure 2:
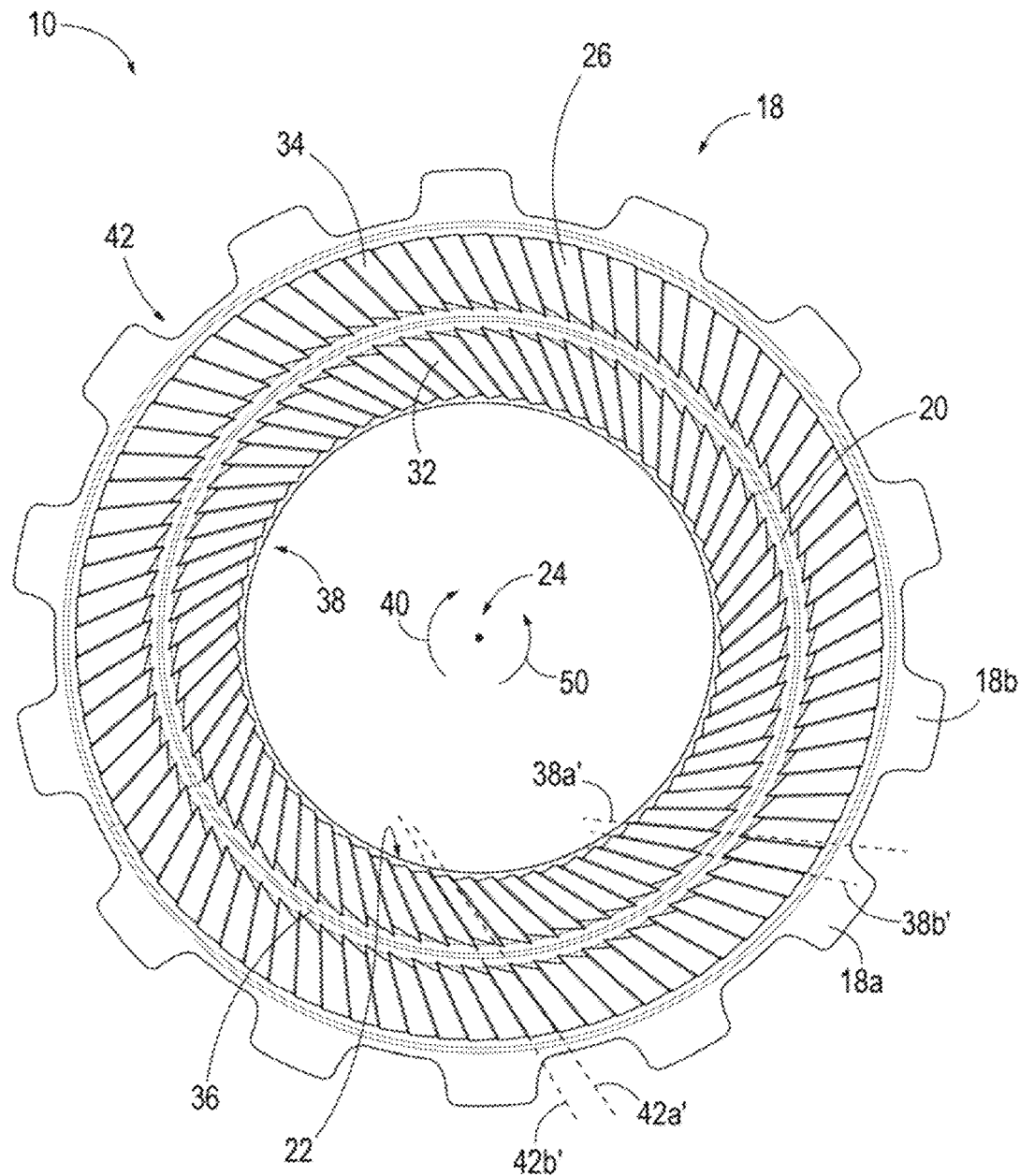
FIG. 2 is bottom plan view of the reaction washer.
Figure 3:
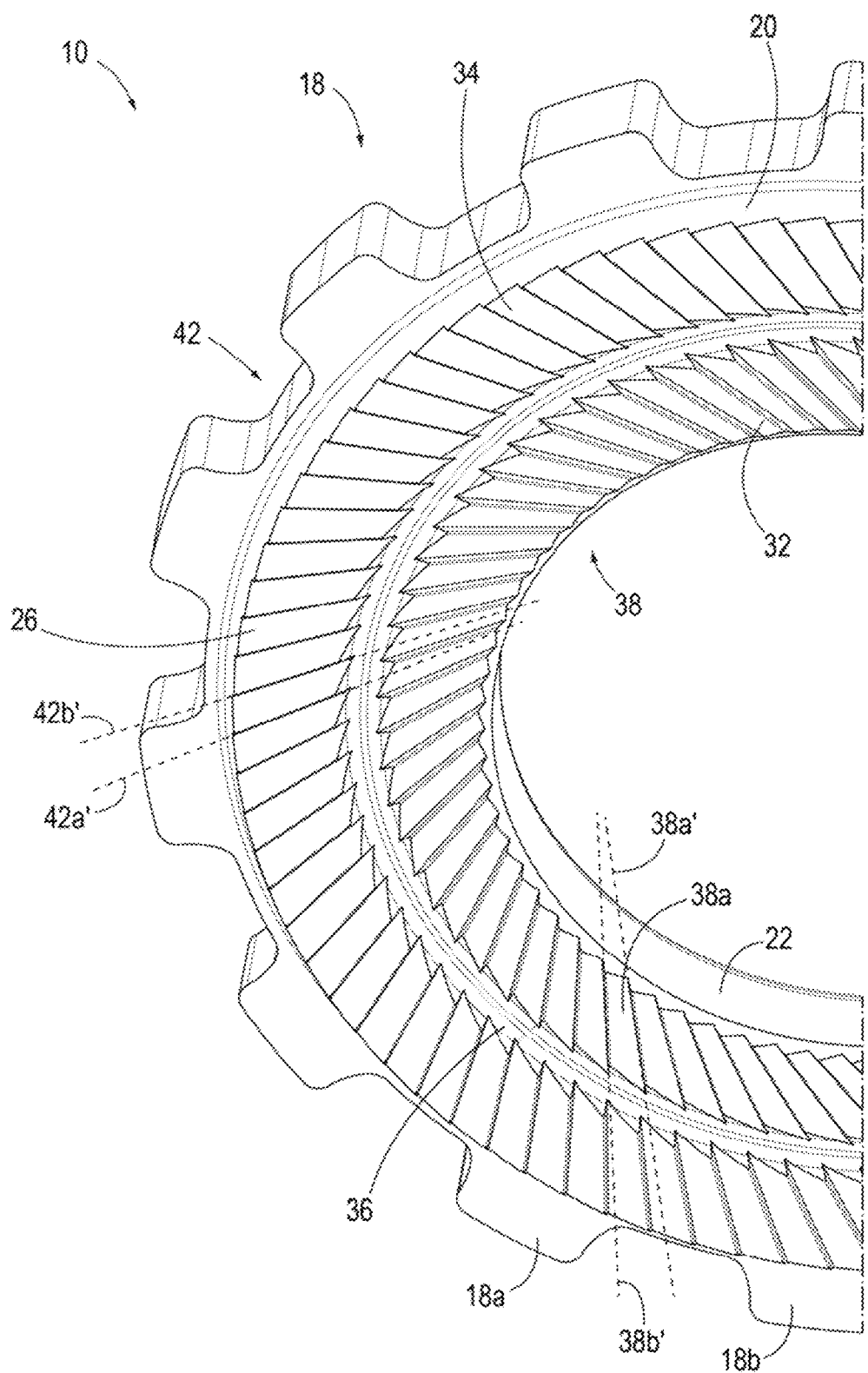
FIG. 3 is a partial perspective view of the reaction washer.

With continued reference to FIG. 5, and also FIGS. 1-3, the reaction washer 10 can include a castellated portion 18 circumferentially disposed around a perimeter of the reaction washer 10 and a main body portion 20 defining an inner diameter 22 of the reaction washer 10. Thus, the reaction washer 10 can have a generally circular shape with nominal thickness. However, it will be appreciated that other shapes and thicknesses are possible and contemplated without departing from the scope of this disclosure.

The castellated portion 18 can include a plurality of castellations 18a, 18b, 18n that cooperate to define an outer diameter of the reaction washer 10 and the inner diameter 22 of the main body portion 20 can slidingly receive the threaded element 12 therethrough so as to define an engagement axis 24. Thus, the reaction washer 10 can slidingly and coaxially receive the threaded element 12 and the nut 16 can threadingly and coaxially receive the threaded element 12, both along the engagement axis 24. As illustrated, the reaction washer 10 includes 14 castellations. As illustrated, each of the castellations 18a, 18b has a generally rectangular shape in plan and elevation views. However, it will be appreciated that the reaction washer 10 could include more or less castellations, and that these castellations could have different shapes, without departing from the scope of this disclosure.

Figure 4:
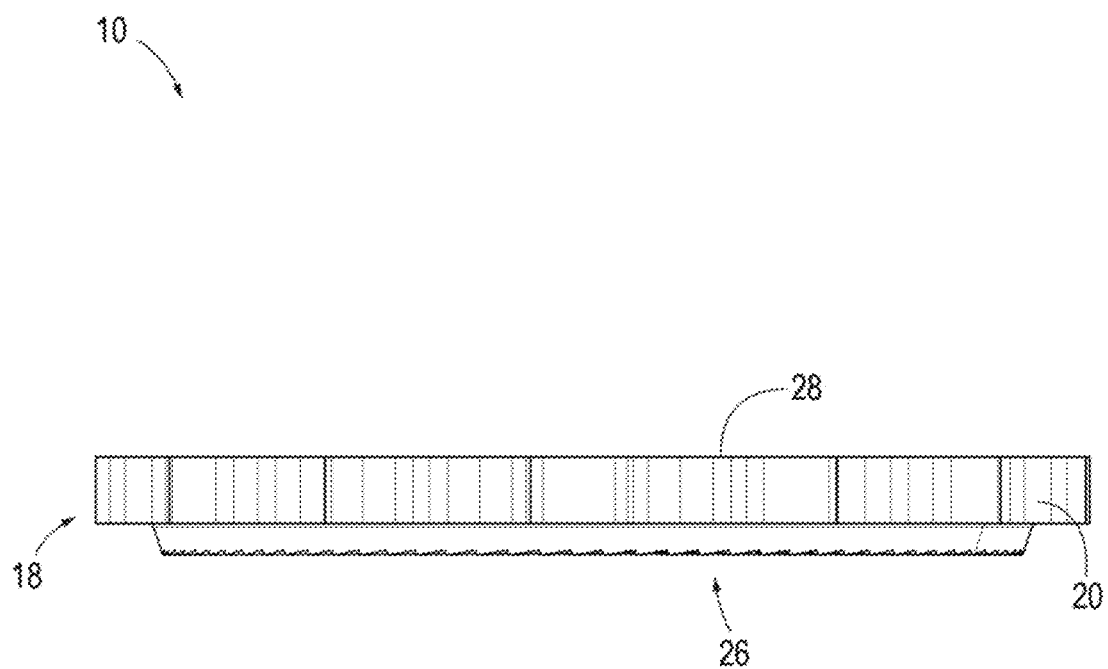
FIG. 4 is an elevation view of the reaction washer.

As shown in FIG. 4, the main body can include a first side 26 and a second side 28. The first side 26 and the second side 28 face in opposite directions. As shown in FIG. 1, the second side 28 can be generally smooth and planar. The second side 28 is configured to face toward the nut 16 when installed on the threaded element 12. However, the second side 28 is not required to be smooth.

With reference to FIG. 2, the first side 26 of the reaction washer 10 is shown in more detail. Notably, the reaction washer 10 can include an inner engagement ring 32 that extends from the first side 26 and is coaxially disposed between the inner diameter 22 and the castellated portion 18. This extension of the inner engagement ring 32 from the first side 26 can be in a direction that is away from the second side 28. The reaction washer 10 can also include an outer engagement ring 34 that extends from the first side 26 and is coaxially disposed between the inner engagement ring 32 and the castellated portion 18.

Like the inner engagement ring 32, the outer engagement ring 34 can extend from the first side 26 in a direction that is away from the second side 28. Thus, high friction features provided by the elements on the first side 26 of the reaction washer 10 engage the flange 14 to help prevent rotation of the reaction washer 10 with respect to the threaded element 12 or the nut 16. Finally, the outer engagement ring 34 may be radially spaced from the inner engagement ring 32 so as to define a ring gap 36.

The inner engagement ring 32 can include a plurality of serrations 38 that each define a respective serration axis that do not intersect with the engagement axis 24 and the outer engagement ring 34 can include a plurality of teeth 42 that each define a respective tooth axis that do not intersect with the engagement axis 24. Each of the plurality of serrations 38 each define a serration length and each of the plurality of teeth 42 can define a tooth length. Additionally, the serration length can be between eight and twelve times greater than the ring gap 36 mentioned hereinbefore. More particularly, the serration length can be ten times greater than the ring gap 36.

Because of this non-intersection of the serration axes and the tooth axes with the engagement axis 24, the plurality of serrations 38 and the plurality of teeth 42 can be longer than the typical layout with other known reaction washers, thereby improving engagement between the reaction washer 10 and the flange 14. The plurality of serrations 38 and the plurality of teeth 42 cooperate to resist rotation of the reaction washer 10 about the engagement axis 24 by engaging the flange 14 to create a force path in a non-orthogonal direction about the engagement axis 24 of the mating face 14a of the flange 14. Due to the aforementioned orientation of the serrations 38, and optionally the orientation of the teeth 42, engagement between the reaction washer 10 and the flange 14 is improved.

The plurality of serrations 38 can include a first serration 38a and a second serration 38b that are adjacent one another and separated by a first serration trough 44. When viewing the first side 26 of the reaction washer 10 in the plan view, the first serration 38a can include a first serration primary face 46, a first serration secondary face 48, and a first serration peak 52 disposed therebetween. The first serration peak 52 can define a maximum distance that the first serration 38a is spaced from the second side 28 in a direction along the engagement axis 24.

Further, the first serration primary face 46 can ramp away from the second side 28 when traveling toward the second serration 38b in a first rotational direction 40 (see FIG. 2 for first rotational direction indication) about the engagement axis 24 and ramp toward the second side 28 when traveling away from the second serration 38b in a second rotational direction 50 (see FIG. 2 for second rotational direction indication) about the engagement axis 24. For reference, the first rotational direction 40 and the second rotational direction 50 are opposite to one another. This arrangement of the plurality of serrations 38 allows for improved engagement between the reaction washer 10 and the flange 14 as will be described in more detail hereinafter.

The first serration 38a can also include a first serration inner face 54 and a first serration outer face 56. The first serration inner face 54 faces toward the inner diameter 22 and defines a terminal end of the first serration 38a. In contrast, the first serration outer face 56 faces toward the outer diameter. However, the first serration outer face 56 also defines a terminal end of the first serration 38a. The first serration inner face 54 defines a first serration inner face plane that is not orthogonal to an imaginary line radially extending from the engagement axis 24 in an orthogonal manner Additionally, the first serration outer face 56 defines a first serration outer face plane that is not orthogonal to the imaginary line radially extending from the engagement axis 24 in an orthogonal manner. Further, the first serration inner face plane is not parallel to the first serration outer face plane. It is noted that because of the orientation of the first serration inner face 54 and the first serration outer face 56 with respect to the engagement axis 24, more force can be transmitted to the flange 14 from the reaction washer 10, thereby helping to prevent rotation between the reaction washer 10 and the flange 14.

The second serration 38b can include a second serration primary face 58, a second serration secondary face 62, and a second serration peak 64 disposed therebetween. The second serration peak 64 defines a maximum distance that the second serration 38b is spaced from the second side 28. Further, the first serration peak 52 is spaced from the second side 28 a distance that is equal to a distance that the second serration peak 64 is spaced from the second side 28.

The second serration 38b can also include a second serration inner face 66 that faces toward the inner diameter 22 of the reaction washer 10 and a second serration outer face 68 that faces toward the outer diameter of the reaction washer 10. The second serration inner face 66 can define a second serration inner face plane that is not orthogonal to the imaginary line radially extending from the engagement axis 24 in an orthogonal manner. Further, the second serration outer face 68 can define a second serration outer face plane that is not orthogonal to the imaginary line radially extending from the engagement axis 24 in an orthogonal manner. Finally, the respective serration axes 38a', 38b' of the first serration 38a and the second serration 38b extend between the respective inner faces 54, 66 and the outer faces 56, 68 are not parallel to one another.

With regard to the outer engagement ring 34, the plurality of teeth 42 can include a first tooth 42a and a second tooth 42b that are adjacent one another with a first tooth trough 72 disposed therebetween. The first tooth 42a can define a first tooth axis 42a'. The first tooth 42a can include a first tooth inner face 74 that faces toward the inner engagement ring 32 and a first tooth outer face 76 that faces toward the outer diameter. Further, the first tooth inner face 74 and the first tooth outer face 76 can define terminal ends of the first tooth 42a and are disposed on the first tooth axis 42a'.

The first tooth 42a can also include a first tooth primary face 78, a first tooth secondary face 82, and a first tooth peak 84 disposed therebetween, from a plan view. The first tooth peak 84 can define a maximum distance that the first tooth 42a is spaced from the second side 28 and the first tooth peak 84 is spaced from the second side 28 a distance that is equal to a distance that the second serration peak 64 is spaced from the second side 28. The first tooth primary face 78 can ramp toward the second side 28 when traveling toward the second tooth 42b in the first rotational direction 40 about the engagement axis 24 and ramp away the second side 28 when traveling away from the second tooth 42b in the second rotational direction 50 about the engagement axis 24. As noted hereinbefore, the first rotational direction 40 and the second rotational direction 50 are opposite one another. The first tooth trough 72 defines a minimum distance that the first tooth 42a is offset from the second side 28.

The second tooth 42b can define a second tooth axis 42b'. Like the first tooth 42a, the second tooth 42b can include a second tooth inner face 86 that faces toward the inner engagement ring 32 so as to not be parallel to the first tooth inner face 74 and a second tooth outer face 88 that faces away from the inner engagement ring 32 so as to not be parallel to the first tooth outer face 76. Further, the second tooth inner face 86 and the second tooth outer face 88 can define terminal ends of the second tooth 42b and are disposed on the second tooth axis 42b'. Additionally, it is noted that the first tooth axis 42a' and the second tooth axis 42b' are not parallel to one another.

The second tooth 42b can also include a second tooth primary face 92, a second tooth secondary face 94, and a second tooth peak 96 disposed therebetween in plan view. The first tooth trough 72 separates the first tooth secondary face 82 from the second tooth primary face 92. Further, the second tooth peak 96 defines a maximum distance that the second tooth 42b is spaced from the second side 28. The first tooth peak 84 is spaced from the second side 28 a distance that is equal to a distance that the second tooth peak 96 is spaced from the second side 28. A second tooth trough 98 defines a minimum distance that the second tooth 42b is offset from the second side 28. Further, the first tooth peak 84 and the second tooth peak 96 are offset from the second side 28 an equal distance and the first tooth trough 72 and the second tooth trough 98 are offset from the second side 28 an equal distance.

The shape and layout of the plurality of serrations 38, and optionally, the plurality of teeth 42 provide many advantages for the reaction washer 10. As noted hereinbefore, there is improved engagement between the reaction washer 10 and the flange 14. As an added bonus, this occurs while also not negatively impacting the mating surface 14a of the flange 14. As will be appreciated, this improved engagement provides for enhanced lock-up with the tool that drives the nut 16 and is attached to the reaction washer 10.

Figure 7A:
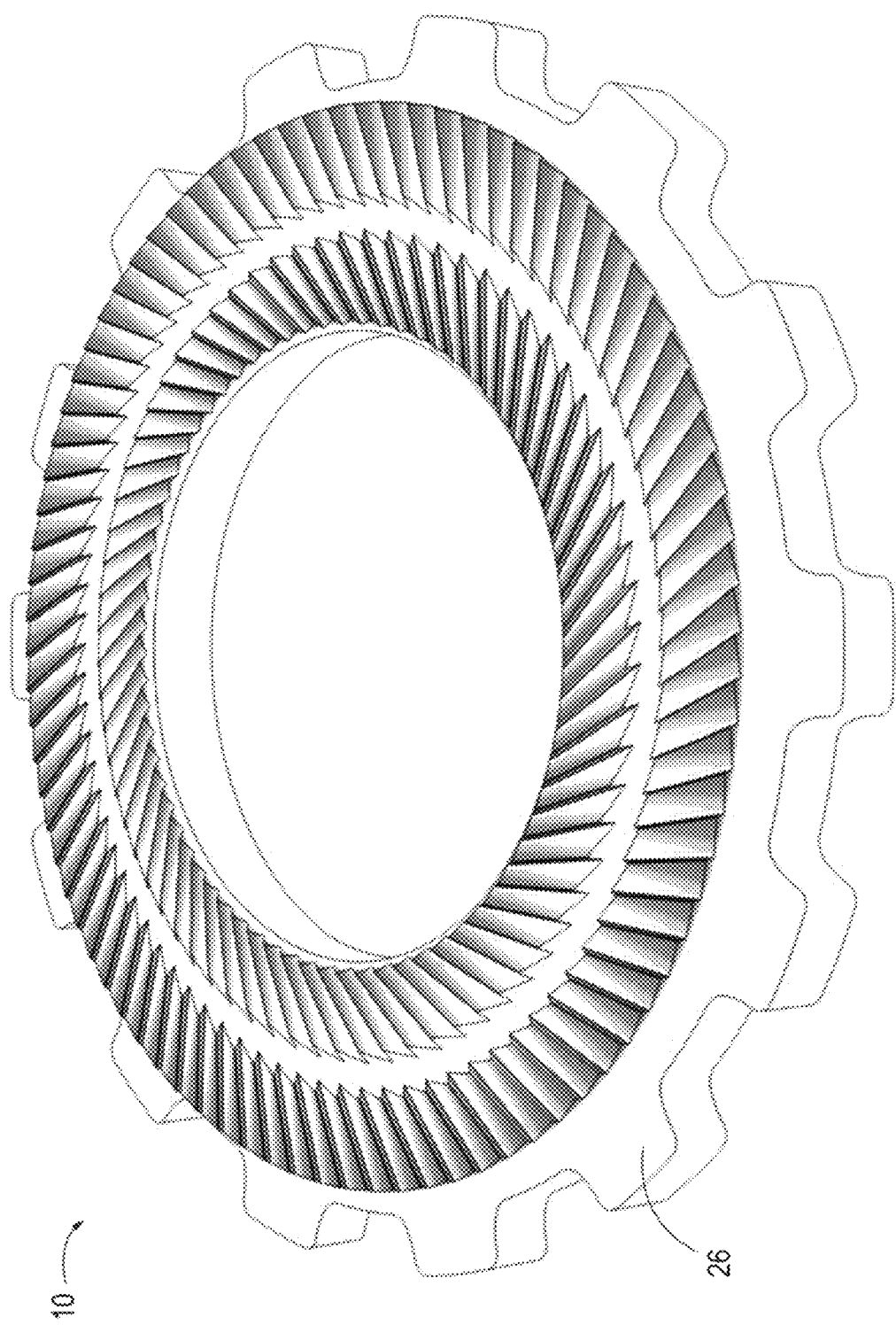
FIG. 7A is a finite element analysis depiction of the reaction washer under load at an initial embedment bite with the flange.
Figure 7B:
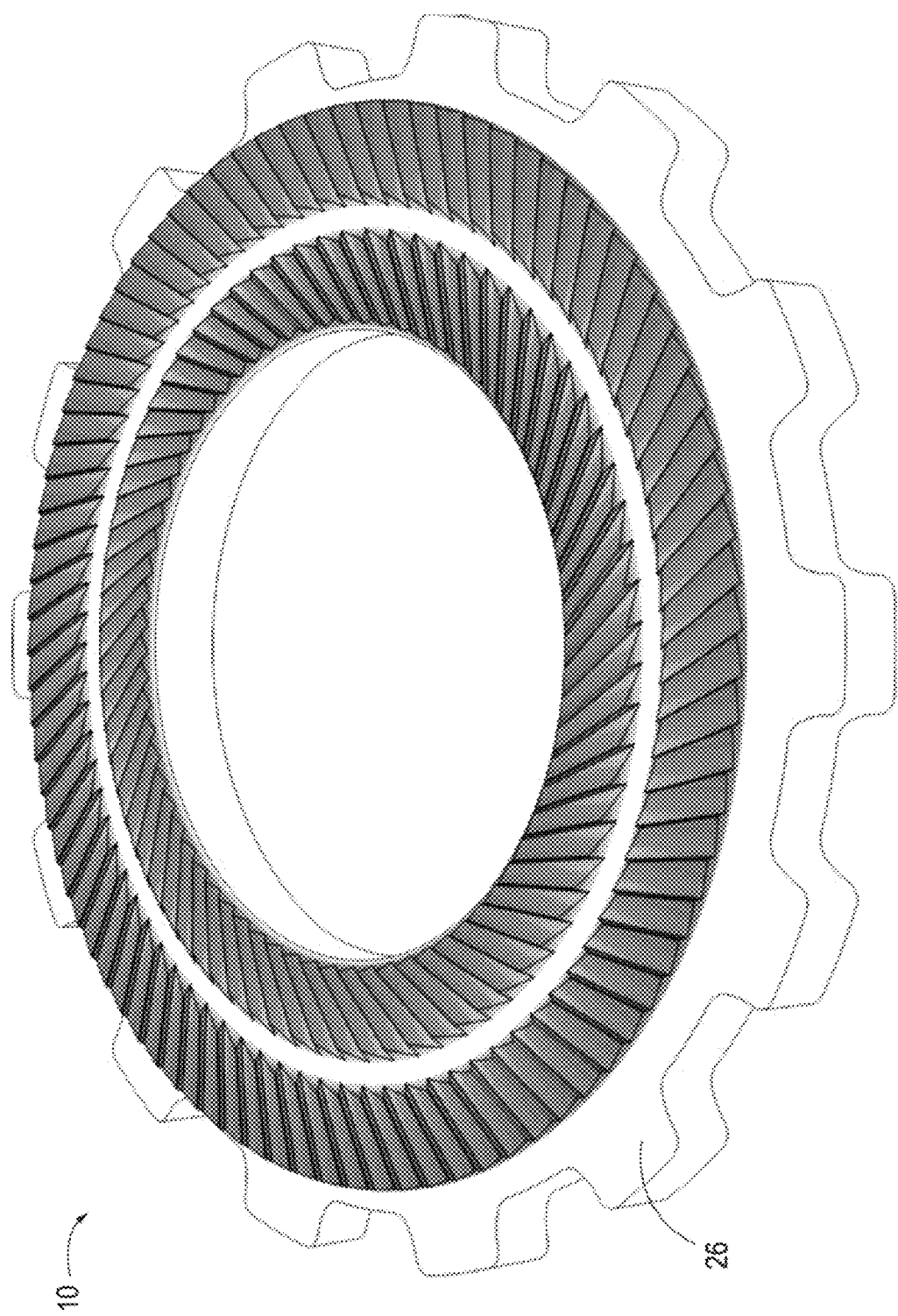
FIG. 7B is a finite element analysis depiction of the reaction washer under load at full embedment bite with the flange
Figure 8A:
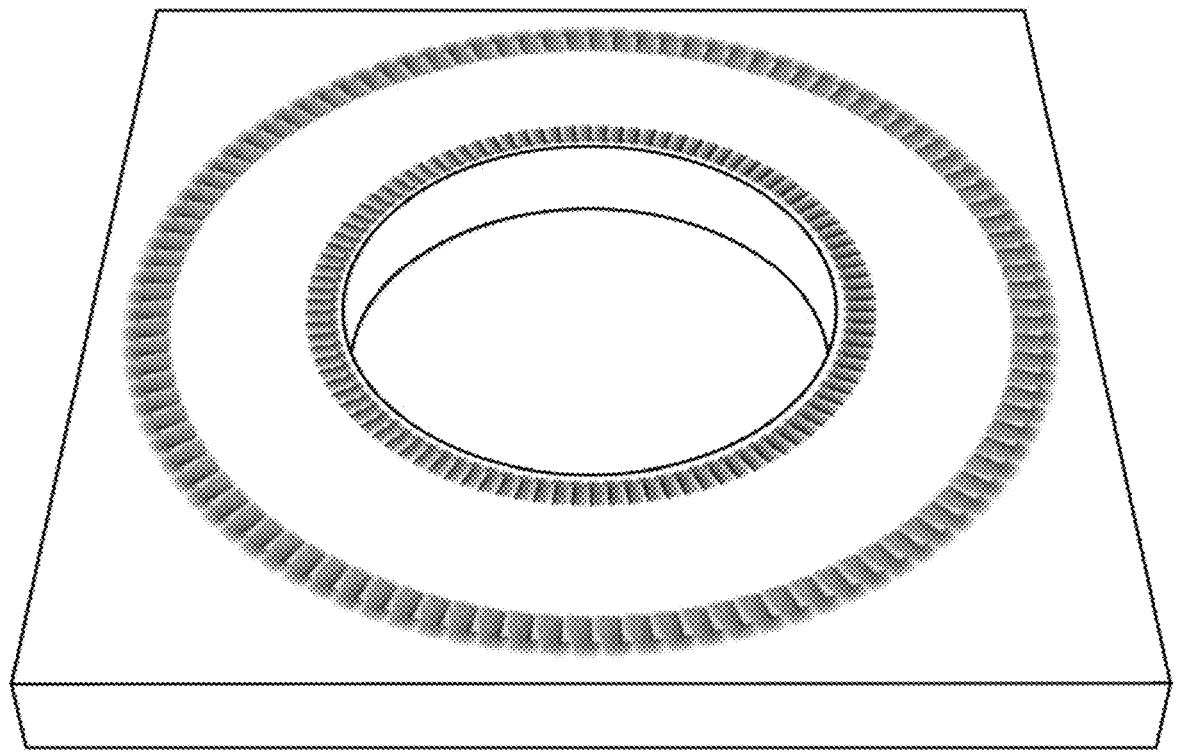
FIG. 8A is a finite element analysis depiction of the flange after engaging a traditional reaction washer at initial embedment.

In view of the above advantages, FIGS. 7-8 are considered particularly relevant. FIGS. 7A and 7B are finite element analysis depictions of the reaction washer 10 under load. In particular, FIG. 7A illustrates the stress flow in the reaction washer 10 at an initial embedment bite (approximately 0.004") with the flange 14 and FIG. 7B illustrates the stress flow in the reaction washer 10 at full embedment bite with the flange 14. Further, FIG. 8A illustrates the stress flow in the flange 14 after engaging a traditional reaction washer at initial embedment (approximately 0.004") that does not include the unique features described hereinabove.

Figure 8B:
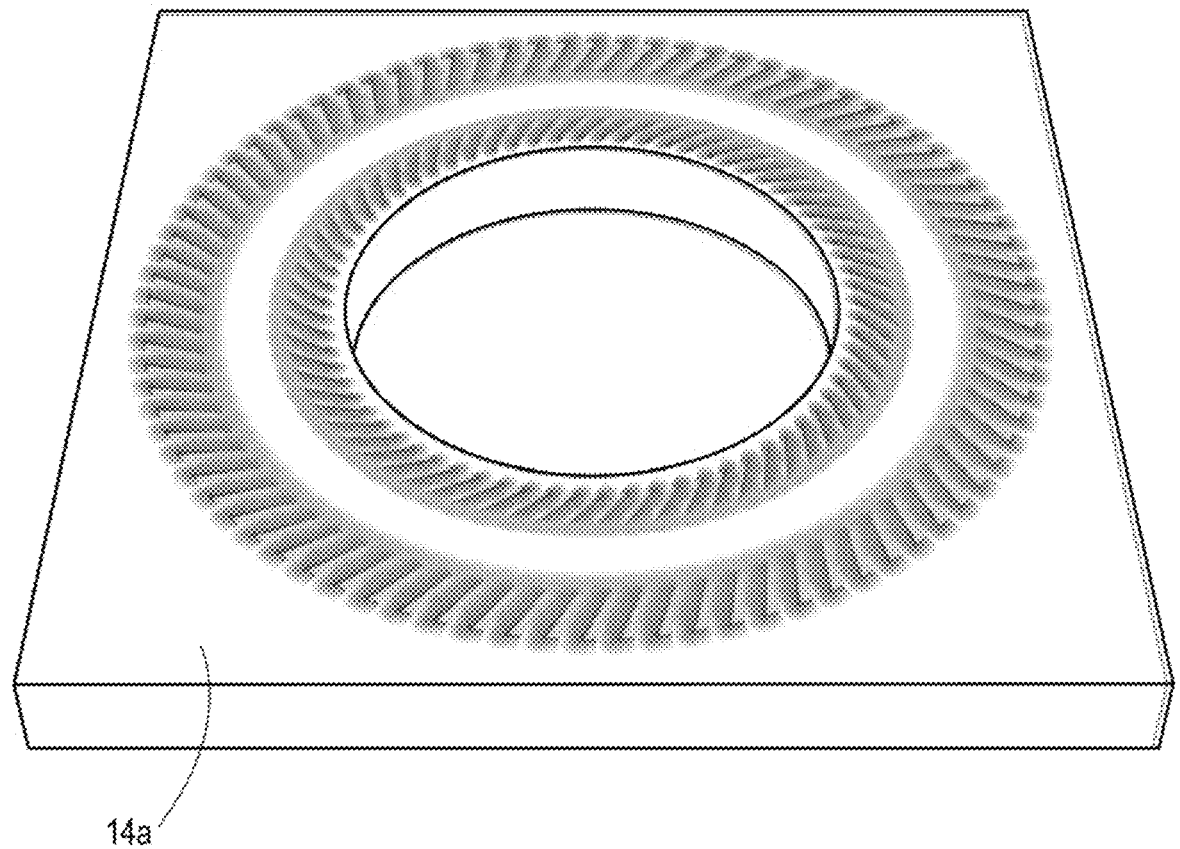
FIG. 8B is a finite element analysis depiction of the flange after engaging the reaction washer of the present disclosure at initial embedment.

In contrast, FIG. 8B illustrates the stress flow in the flange 14 after engaging the described reaction washer 10 at initial embedment (approximately 0.004"). As is considered apparent, comparison between FIGS. 8A and 8B illustrates that the improved reaction washer 10, which is illustrated in FIG. 8B, provides lower stress concentration in the flange 14. This is because of a longer bite length and angled load path on the flange 14, which is due to the layout of the plurality of serrations 38, and optionally, the layout of the plurality of teeth 42 of the reaction washer 10.

Figure 9:
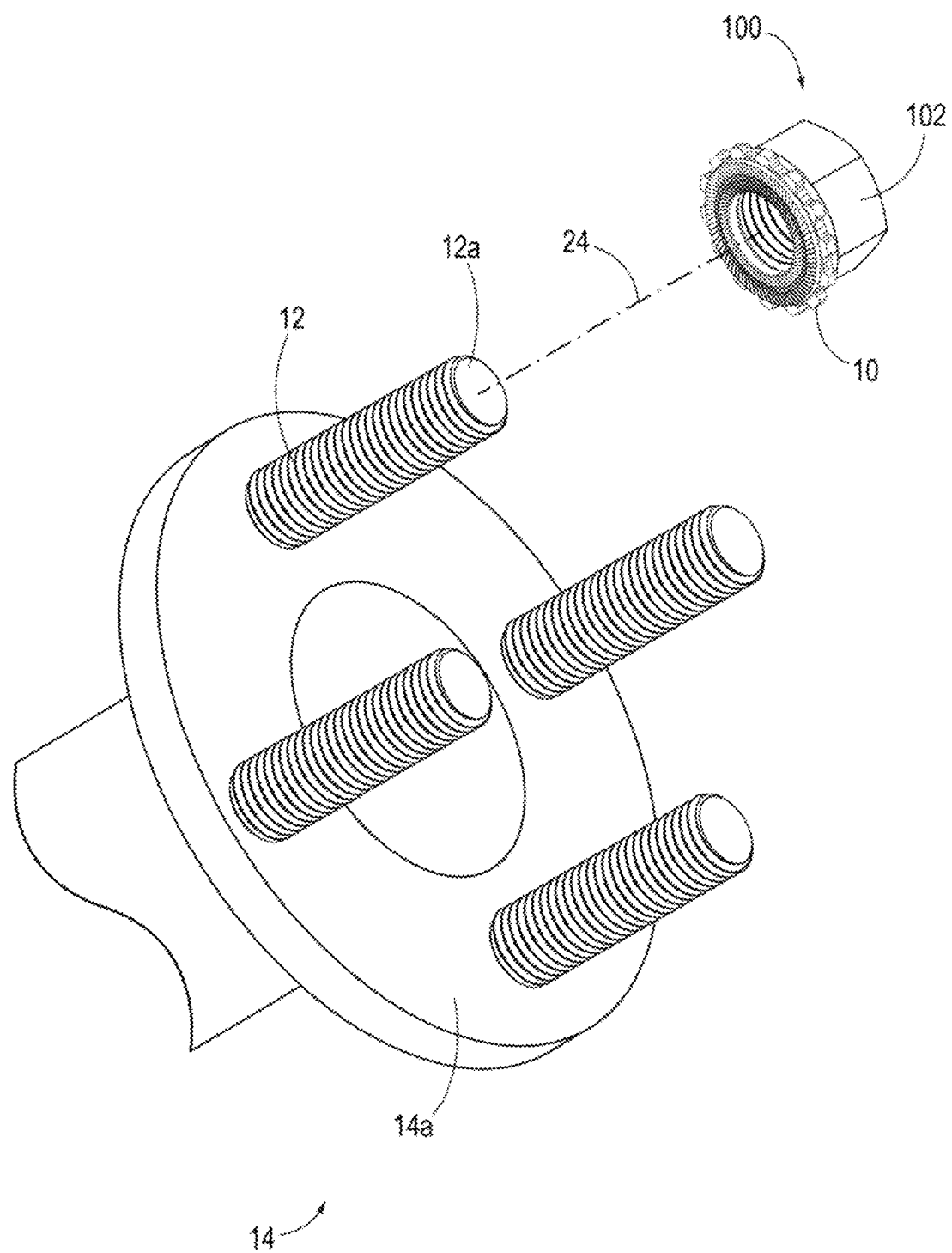
FIG. 9 is a perspective view of the reaction washer with the flange and a nut.

With reference to FIG. 9, a thread attachment assembly 100 is shown. The thread attachment assembly 100 includes a nut 102 that defines a nut inner diameter and a nut outer diameter and the reaction washer 10. The reaction washer 10 is rotatably connected to the nut. Further, the outer diameter of the reaction washer 10 is greater than the nut outer diameter of the nut 102 and the nut 102 is directly connected to the reaction washer so as to allow independent rotation between the reaction washer 10 and the nut 102. Like FIG. 5, the reaction washer 10 in FIG. 9 can be slid onto the free end 12a of the threaded element 12 so as to engage the mating face 14a of the flange 14. However, with the thread attachment assembly 100, the reaction washer 10 is permanently attached to the nut 102, while still providing rotational independence between the reaction washer 10 and the nut 102. The reaction washer 10 can be attached to the nut 102 by a variety of methods. For example, the nut 102 can include a flared element that extends into the inner diameter of the reaction washer 10 to join the reaction washer 10 and the nut 102 together.

A reaction washer has been described above in particularity. Modifications and alternations will occur to those upon reading and understanding the preceding detail description. The invention, however, is not limited to only the embodiment described above. Instead, the invention is broadly defined by the appended claims and the equivalents thereof.

The invention claimed is:

1. A reaction washer, comprising:
a castellated portion circumferentially disposed around a perimeter of the reaction washer, wherein the castellated portion includes a plurality of castellations that cooperate to define an outer diameter of the reaction washer; and
a main body portion defining an inner diameter that slidingly receives an associated threaded element therethrough so as to define an engagement axis, the main body including a first side and a second side that face in opposite directions, the main body also including an inner engagement ring extending from the first side and coaxially disposed between the inner diameter and the castellated portion, wherein the inner engagement ring includes a plurality of serrations that each define a respective serration axis that do not intersect with the engagement axis, wherein the main body includes an outer engagement ring extending from the first side and coaxially disposed between the inner engagement ring and the castellated portion, and wherein the outer engagement ring includes a plurality of teeth that each define a respective tooth axis that do not intersect with the engagement axis.

2. The reaction washer of claim 1, wherein the plurality of teeth includes a first tooth that defines a first tooth axis and a second tooth that defines a second tooth axis, the first tooth and the second tooth being adjacent one another, the first tooth including a first tooth inner face that faces toward the inner engagement ring and a first tooth outer face that faces toward the outer diameter, the second tooth including a second tooth inner face that faces toward the inner engagement ring so as to not be parallel to the first tooth inner face and a second tooth outer face that faces away from the inner engagement ring so as to not be parallel to the first tooth outer face.

3. The reaction washer of claim 2, wherein the first tooth inner face and the first tooth outer face define terminal ends of the first tooth and are disposed on the first tooth axis and the second tooth inner face and the second tooth outer face define terminal ends of the second tooth and are disposed on the second tooth axis, and wherein the first tooth axis and the second tooth axis are not parallel to one another.

4. The reaction washer of claim 1, wherein the outer engagement ring is radially spaced from the inner engagement ring so as to define a ring gap.

5. The reaction washer of claim 4, wherein each of the plurality of serrations each define a serration length, and wherein the serration length is between eight and twelve times greater than the ring gap.

6. The reaction washer of claim 4, wherein each of the plurality of serrations each define a serration length, and wherein the serration length is ten times greater than the ring gap.

7. The reaction washer of claim 1, wherein the plurality of serrations includes a first serration and a second serration that are adjacent one another and separated by a first serration trough, the first serration including a first serration primary face and a first serration secondary face with a first serration peak disposed therebetween, the second serration including a second serration primary face and a second serration secondary face with a second serration peak disposed therebetween, wherein the first serration trough separates the first serration secondary face from the second serration primary face.

8. The reaction washer of claim 7, wherein the plurality of teeth includes a first tooth and a second tooth that are adjacent one another and separated by a first tooth trough, the first tooth including a first tooth primary face and a first tooth secondary face with a first tooth peak disposed therebetween, the second tooth including a second tooth primary face and a second tooth secondary face with a second tooth peak disposed therebetween, wherein the first tooth trough separates the first tooth secondary face from the second tooth primary face.

9. The reaction washer of claim 8, wherein the first tooth peak is offset from the second side so as to define a maximum distance that the first tooth is spaced from the second side and the second tooth peak is offset from the second side so as to define a maximum distance that the second tooth is spaced from the second side, wherein the first tooth trough defines a minimum distance that the first tooth is offset from the second side and a second tooth trough defines a minimum distance that the second tooth is offset from the second side, and wherein the first tooth peak and the second tooth peak are offset from the second side an equal distance and the first tooth trough and the second tooth trough are offset from the second side an equal distance.

10. The reaction washer of claim 8, wherein the first serration primary face ramps away from the second side when traveling toward the second serration in a first rotational direction about the engagement axis.

11. The reaction washer of claim 10, wherein the first tooth primary face ramps toward the second side when traveling toward the second tooth in the first rotational direction about the engagement axis.

12. The reaction washer of claim 11, wherein the first serration primary face ramps toward the second side when traveling away from the second serration in a second rotational direction about the engagement axis and the first tooth primary face ramps away the second side when traveling away from the second tooth in the second rotational direction about the engagement axis, and wherein the first rotational direction and the second rotational direction are opposite one another.

13. The reaction washer of claim 7, wherein the first serration includes a first serration inner face that faces toward the inner diameter and a first serration outer face that faces toward the outer diameter, and wherein the first serration inner face defines a first serration inner face plane that is not orthogonal to an imaginary line radially extending from the engagement axis in an orthogonal manner and the first serration outer face defines a first serration outer face plane that is not orthogonal to the imaginary line radially extending from the engagement axis in an orthogonal manner.

14. The reaction washer of claim 13, wherein the first serration inner face plane is not parallel to the first serration outer face plane.

15. The reaction washer of claim 13, wherein the second serration includes a second serration inner face that faces toward the inner diameter and a second serration outer face that faces toward the outer diameter, wherein the second serration inner face defines a second serration inner face plane that is not orthogonal to the imaginary line radially extending from the engagement axis in an orthogonal manner and the second serration outer face defines a second serration outer face plane that is not orthogonal to the imaginary line radially extending from the engagement axis in an orthogonal manner.

16. The reaction washer of claim 15, wherein the first serration inner face and the first serration outer face define terminal ends of the first serration and the second serration inner face and the second serration outer face define terminal ends of the second serration, and wherein the respective serration axes extending between the respective inner faces and the outer faces are not parallel to one another.

17. The reaction washer of claim 1, wherein the plurality of serrations includes a first serration and a second serration that are adjacent one another and separated by a first serration trough, the first serration including a first serration peak that defines a maximum distance that the first serration is spaced from the second side and the second serration includes a second serration peak that defines a maximum distance that the second serration is spaced from the second side, and wherein the first serration peak is spaced from the second side a distance that is equal to a distance that the second serration peak is spaced from the second side.

18. The reaction washer of claim 17, wherein the main body includes an outer engagement ring extending from the first side and coaxially disposed between the inner engagement ring and the castellated portion, the outer engagement ring including a first tooth and a second tooth that are adjacent one another and separated by a first tooth trough, the first tooth including a first tooth peak that defines a maximum distance that the first tooth is spaced from the second side and the second tooth including a second tooth peak that defines a maximum distance that the second tooth is spaced from the second side, and wherein the first tooth peak is spaced from the second side a distance that is equal to a distance that the second tooth peak is spaced from the second side.

19. The reaction washer of claim 18, wherein the first tooth peak is spaced from the second side a distance that is equal to a distance that the second serration peak is spaced from the second side.

20. The reaction washer of claim 1, wherein the plurality of serrations and the plurality of teeth cooperate to resist rotation of the reaction washer about the engagement axis by engaging an associated flange to create a force path in a non-orthogonal direction about the engagement axis of a mating face of the associated flange.

21. A thread attachment assembly, comprising:
a nut that defines a nut inner diameter and a nut outer diameter; and
the reaction washer of claim 1, wherein the reaction washer is rotatably connected to the nut.

22. The thread attachment assembly of claim 21, wherein the outer diameter of the reaction washer is greater than the nut outer diameter and the nut is directly connected to the reaction washer so as to allow independent rotation between the reaction washer and the nut.

* * * * *